May 8, 1951  E. B. CLARK ET AL  2,552,149
JUNCTION BOX CABLE CONNECTOR
Filed May 27, 1949

Inventors:
Edward B. Clark,
George Carlson,
by
Their Attorney.

Patented May 8, 1951

2,552,149

UNITED STATES PATENT OFFICE 2,552,149

JUNCTION BOX CABLE CONNECTOR

Edward B. Clark, Milford, and George Carlson, Trumbull, Conn., assignors to General Electric Company, a corporation of New York Application May 27, 1949, Serial No. 95,844

3 Claims. (Cl. 285—6.5)

This invention relates to a connector for securing a cable to a junction box or electrical fixture at a knockout or entrance aperture.

An object of our invention is to provide a device engageable with an electric fixture, such as junction and entrance boxes, for securing a cable to the fixture.

A further object of our invention is to provide a connector of increased strength without increasing the amount of material required to manufacture this device. The increased strength of this connector makes it particularly suitable for use with armored cable or cable enclosed in metallic tubing.

Another object of our invention is to construct the connector in a manner which will permit it to be attached to the electrical fixture and adjusted from a point which is entirely outside of the fixture.

Still a further object of our invention is to provide a connector which is economically manufactured from either cast metal or fabricated sheet metal.

In accomplishment of the foregoing objectives, a feature of our invention consists in constructing a connector to receive an electric cable sheath within its body, and having an end portion appropriately shaped to be engaged within a knockout or entrance aperture of an electrical fixture. A part of the end portion engageable in this aperture includes an annular groove extending around part of the periphery. Diametrically opposite from this annular groove is a tongue with an outwardly flared portion which may be inserted through the aperture, the tongue being adjustable with respect to the connector body so that this outwardly flared end portion may be forced outwardly to lock the connector within the entrance aperture.

Our invention will be better understood from the following description taken in connection with the accompanying drawing, and its scope will be pointed out in the appended claims.

Figure 1:
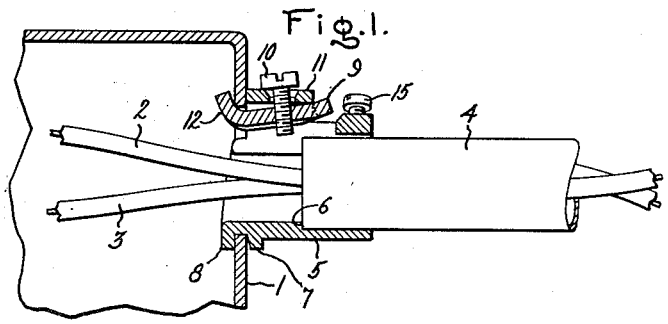
Figure 2:
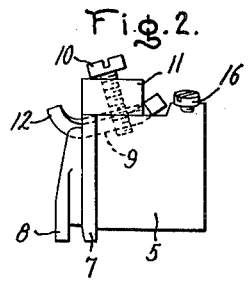
Figure 3:
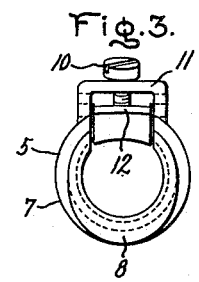
Figure 4:
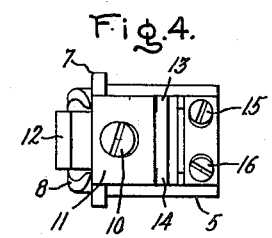
Figure 5:
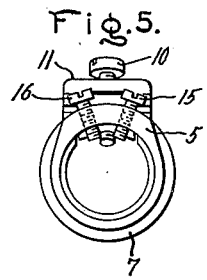
Figure 6:
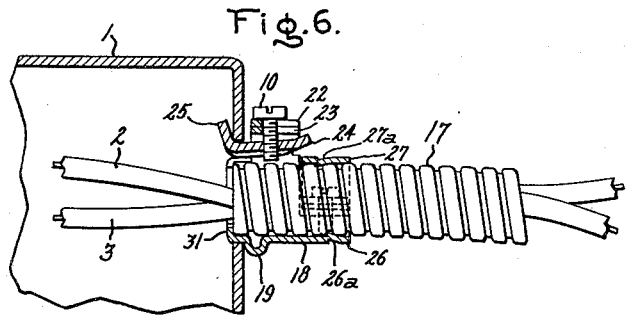
Figure 7:
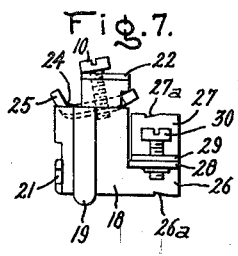
Figure 8:
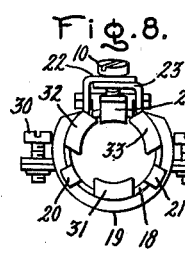
Figure 9:
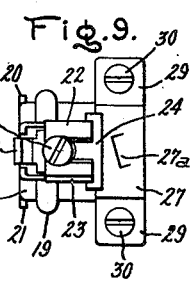
Figure 10:
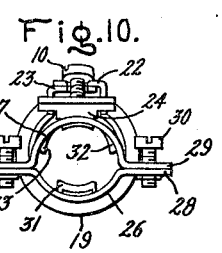

Referring to the drawing, Fig. 1 is a side elevation in section of our improved connector attached to a junction box; Fig. 2 is a side elevation of the connector itself; Fig. 3 is an end view of this same connector; Fig. 4 is a plan view; Fig. 5 is an end view taken at the opposite end from the view shown by Fig. 3; Fig. 6 is a side elevation in section of a modified form of our improved connector; Fig. 7 is a side elevation of the device shown by Fig. 6; Fig. 8 is an end elevation of the device shown by Fig. 6; Fig. 9 is a plan view of the connector shown by Fig. 6; and Fig. 10 is an end elevation of the opposite end shown by Fig. 8.

Figs. 1 through 5 of the drawing illustrate a connector made in accordance with our invention from a cast material, such as for example malleable iron. In Fig. 1 the connector is shown secured to a wall 1 of a junction box. This connector serves as a means for securing a cable to the junction box at one of the entrance holes. The cable itself, as shown in Fig. 1, may include a plurality of conductors such as 2 and 3 encased within a shield, such as metallic tubing 4. As shown, the connector is engaged within the aperture at the entrance or knockout hole of the junction box, and the connector also provides a means for gripping the metallic tubing 4.

The body 5 of this connector is molded into a suitable shape so that its one end may receive the cable sheath 4, and the other end may be engaged within the entrance aperture of the junction box. Since the metallic tubing conventionally used has a cylindrical shape, we prefer to show this connector as having a generally cylindrical shape, although our invention obviously includes other shapes. The righthand end of the connector, as shown by Fig. 1, has a slightly larger internal diameter than the remainder of the connector. This permits tubing 4 to be inserted within the connector until it is in abutting relation with the internal shoulder 6. In order to attach the connector within the aperture of the junction box, the lefthand end of this connector is provided with an annular rib 7 extending only partially around the outer surface. In addition, an overhanging lip 8 extends partially around the outer surface of the connector. Lip 8 in cooperation with the rib 7 forms an annular groove extending partially around the outer surface. As shown by Fig. 1, the lip 8 and rib 7 engage wall 1 of the junction box.

Since lip 8 and rib 7 extend only around a part of the periphery of this connector, an additional means is required to secure the connector to the junction box. For this purpose we employ a T-shaped tongue 9, which is adjustably mounted with respect to the connector body 5 by a screw-threaded means 10. To provide adequate space for adjustment of tongue 9, the generally cylindrical shape of body 5 is interrupted to form a bridge portion 11, which forms an integral part of body 5. The part of body 5 subtended by bridge 11 remains open internally, permitting the tongue to move inwardly as screw 10 is withdrawn. The outer end 12 of the tongue is flared outwardly so that it may engage the wall of the junction box when in operative position. The opposite end of the tongue includes the outwardly extending arms 13 and 14 which form the head of the T. These outwardly extending arms serve as a pivot for tongue 9 and transmit lateral forces between the tongue and body 5 of the connector through bridge 11.

Any suitable form of clamping means may be employed for anchoring the outer sheath 4 of the cable to the connector. For use with metallic tubing, however, we find it convenient and preferable to anchor the sheath to the connector by means of screw-threaded members which are threaded through the cylindrical portion of body 5. As shown in Figs. 1 through 5, we employ screws 15 and 16, each of which has a pointed end to engage the metallic tubing 4. While we have shown two screws in this particular embodiment, it will be understood that either one screw or a plurality of similar screws might be employed. This particular embodiment also illustrates the screws 15 and 16 as placed on the upper side of the connector. However, for other applications, it may be preferable to place these screws in other circumferential positions.

An important advantage of this connector is the ease with which it may be installed. It is apparent that the conductors 2 and 3 may be passed through the connector; and the sheath surrounding the conductors is rigidly attached to the connector by means of the pointed screws 15 and 16. To mount the connector within the knockout or entrance aperture of the junction box, screw 10, which is in threaded engagement with tongue 9, is rotated to permit tongue 9 to drop down, to the position as shown by Fig. 2. It will be noted in this connection that screw 10 makes a loose fit through the aperture in bridge 11. This permits a pivoting action of the tongue so that the outwardly-flared tongue portion 12 may move inwardly. To increase this pivotal action, it may be desirable to employ a screw 10 having the under surface of its head rounded. With tongue 9 dropped downwardly as described above, the connector may be readily inserted through the entrance aperture with outwardly-flared end 12 of the tongue and the overhanging lip 8 on the body of the connector inside of the junction box. While the connector is held in this position, screw 10 may be rotated to draw tongue 9 outwardly, whereby the outwardly-flared end portion 12 engages the inside of wall 1 of the junction box, and the connector is firmly anchored to the junction box.

The general form of the body 5 of this connector, illustrated by Figs. 1 through 5, lends itself particularly to formation by casting or molding. However, with slight variations, our invention is equally aplicable to a connector body formed from sheet metal. Likewise, our invention is not limited to use with metallic tubing as the outer sheath of the cable. Variations may be made in the cable clamping means, so that this connector is equally well suited for use with armored cable or non-metallic cable sheaths. In Figs. 6 through 10, we have shown a variation in the form of a cable connector fabricated from sheet metal, such as for example sheet steel, and adapted for use as a connector for armored cable.

Referring to Figs. 6 through 10, conductors 2 and 3 are here shown as enclosed by an armored sheath 17. Connector body 18, in accordance with this embodiment, is fabricated from a sheet metal, for example sheet steel. From the flat metal stock making up body 18, the projecting portion 19 is formed, for example by a rolling operation, to result in the finished assembly as an annulus extending partially around the connector body. Ears 20 and 21 are bent outwardly from the formed body to create lips which cooperate with annulus 19 to anchor the lower portion of the connector to the junction box wall 1, lips 20 and 21 being inside of the box and the annulus 19 being outside. The material making up body 18 is bent to provide the appropriate connector shape to receive the cable, and this shape will normally be cylindrical. The upper portion of this fabricated connector is bent to form a bridge, and the ends 22 and 23 of the sheet steel overlap to form the top part of this bridge. Again, this construction results in an open space under the bridge member. This space within body 18 subtended by the bridge portion permits T-shaped tongue 24 to move inwardly or outwardly with respect to the body portion. Tongue 24, as in the previous embodiment is adjustably positioned and supported by a screw 10. Tongue 24 also has an outwardly-flared end portion 25 engageable with wall 1 of the junction box inside of the entrance aperture. Screw 10 extends loosely through the bridge portion of the body so that by slacking off on screw 10 the outwardly-flared end portion 25 may move inwardly to permit the connector to be inserted within the knockout or entrance aperture. Then by tightening screw 10, the tongue is raised upwardly so that the end portion 25 engages junction box wall 1 inside of the aperture.

A clamping means for the cable sheath, shown by Figs. 6 through 10, serves to maintain the cable in locked position with respect to the connector body, and hence with respect to the junction box. This variation of the clamp is made up in two parts. The lower part 26 of the cable sheath clamp is semi-cylindrical in shape and forms a part of body 18. The upper part 27 of the cable clamp is also semi-cylindrical in shape and both members 26 and 27 have outwardly-extending flanges 28 and 29, respectively, on each side of the connector for cooperation with clamping screws 30. The portion 26 may be lanced at 26a to form an internal projection of suitable shape to engage cable covering 17; and also the portion of the clamp 27 is lanced at 27a to create a similar internal projection. In addition, the end of the connector adjacent the junction box may include inwardly turned ears, such as 31, 32, and 33 to prevent the armored cable sheath from projecting inside the junction box.

From the above disclosure, it will be seen that we have provided an improved connector for firmly securing a cable to a junction box or other electrical fixture. This construction does not require that the body portion be slotted, for example with cross cuts, in order to provide the necessary expansion to lock the connector to the electrical fixture. This construction, therefore, permits greatly increased strength without employing additional material in the manufacture of the device. This connector is readily attached to a fixture since all of its adjustments and operating means are external of the junction box to which it is attached. Because of its simplicity, this connector may be economically manufactured by either casting or by fabrication from sheet material. Furthermore, by a simple modification of the cable clamping means, this connector is equally suitable for metallic tubing, armored cable, or non-metallic sheath cable.

While the present invention has been described by reference to particular embodiments thereof, it will be understood that numerous modifications may be made by those skilled in the art without actually departing from the invention. We, therefore, aim in the appended claims to cover all such equivalent variations as come within the true spirit and scope of the foregoing disclosure.

What we claim as new and desire to secure by Letters Patent of the United States is:

1. A connector for securing a cable to a wall at an entrance aperture comprising a body member having an end portion adapted to be received within the entrance aperture, flange means defining an annular groove extending partially around the outer surface of said body member adjacent said end portion for engagement with a portion of the wall defining the aperture, a tongue loosely carried by said body member opposite said flange means, said tongue having on outwardly-flared end portion, means cooperating with said body member for forcing said flared end portion outwardly to engage the wall defining the aperture, and means for securing the cable to said body member.

2. A connector for securing a cable to a fixture wall at an entrance aperture comprising a body having one end shaped to be receivable within the entrance aperture and the other end adapted to receive the cable, an overhanging lip on said one end extending outwardly from said body, an annular rib extending outwardly from the surface of said body in spaced relation from said lip to form a groove between said lip and said rib engageable with an angularly limited portion of the junction box wall defining the entrance aperture, a tongue adjustably carried by said body and having an outwardly flared end portion adapted to engage the wall within the entrance aperture opposite said groove, means for adjustment of the position of the end portion of said tongue with respect to said body, whereby said tongue moves inwardly to permit said one end to be inserted in the aperture and is forced outwardly by said means to secure said body to the fixture, and means for clamping the cable to said body.

3. A connector for securing a cable to an apertured wall comprising a body member having a substantially cylindrical wall portion, means defining an annular groove extending partially around the circumference of said body member adjacent one end, a bridge forming part of said body member and extending outwardly from said cylindrical wall portion opposite said annular groove, the portion of the cylindrical wall of said body member subtended by said bridge being open through at least part of the longitudinal dimension of said body member and commencing from said one end, a tongue having an outwardly-flared end portion receivable under said bridge, threaded means loosely extending through said bridge and engaging said tongue, and clamping means to retain the cable within said connector, said annular groove being engageable with the apertured wall and said outwardly flared tongue portion being insertable through said aperture, whereby rotation of said threaded means forces said tongue outwardly to engage said outwardly-flared portion inside the wall.

EDWARD B. CLARK.
GEORGE CARLSON.

REFERENCES CITED

The following references are of record in the file of this patent:

UNITED STATES PATENTS

| Number | Name | Date |
| --- | --- | --- |
| 1,885,228 | Buchanan | Nov. 1, 1932 |